United States Patent
Garg et al.

(10) Patent No.: US 8,645,409 B1
(45) Date of Patent: Feb. 4, 2014

(54) CONTEXTUAL SEARCH TERM EVALUATION

(75) Inventors: Ashutosh Garg, Sunnyvale, CA (US); Kedar Dhamdhere, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 938 days.

(21) Appl. No.: 12/061,569

(22) Filed: Apr. 2, 2008

(51) Int. Cl.
*G06F 17/30* (2006.01)
*G06F 7/00* (2006.01)

(52) U.S. Cl.
USPC .......................................... 707/769; 707/771

(58) Field of Classification Search
USPC ............................. 707/769, 999.001–999.005
See application file for complete search history.

(56) References Cited

U.S. PATENT DOCUMENTS

| | | | |
|---|---|---|---|
| 6,169,986 B1 * | 1/2001 | Bowman et al. | 707/999.005 |
| 6,304,864 B1 * | 10/2001 | Liddy et al. | 707/E17.109 |
| 6,347,314 B1 * | 2/2002 | Chidlovskii | 707/999.004 |
| 6,385,602 B1 * | 5/2002 | Tso et al. | 1/1 |
| 6,408,294 B1 * | 6/2002 | Getchius et al. | 707/999.004 |
| 6,424,358 B1 * | 7/2002 | DiDomizio et al. | 707/999.01 |
| 6,823,333 B2 * | 11/2004 | McGreevy | 707/999.003 |
| 2003/0069873 A1 * | 4/2003 | Fox et al. | 707/1 |
| 2004/0068486 A1 * | 4/2004 | Chidlovskii | 707/3 |
| 2005/0076012 A1 * | 4/2005 | Manber et al. | 707/3 |
| 2006/0129534 A1 * | 6/2006 | Jones et al. | 707/3 |
| 2006/0206454 A1 * | 9/2006 | Forstall et al. | 707/3 |
| 2007/0162481 A1 * | 7/2007 | Millett | 707/101 |
| 2007/0266002 A1 * | 11/2007 | Chowdhury et al. | 707/2 |
| 2007/0288498 A1 * | 12/2007 | Dietz et al. | 707/102 |
| 2009/0055373 A1 * | 2/2009 | Haviv-Segal | 707/5 |

* cited by examiner

*Primary Examiner* — Kannan Shanmugasundaram
(74) *Attorney, Agent, or Firm* — Fish & Richardson P.C.

(57) ABSTRACT

Apparatus, systems and methods for contextual search term evaluation are disclosed. A current search query is received during a search session. A predicate subsequence in the search query is identified. A subsequent search term in the query is identified. The search term attributes of the subsequent search term are adjusted.

18 Claims, 4 Drawing Sheets

CONTEXTUAL SEARCH TERM EVALUATION

BACKGROUND

This document relates to processing search queries.

The rise of the Internet has enabled access to a wide variety of content items, e.g., video and/or audio files, web pages for particular subjects, news articles, etc. Content items of particular interest to a user can be identified by a search engine in response to a user query. One example search engine is the Google search engine provided by Google Inc. of Mountain View, Calif., U.S.A. The query can include one or more search terms or phrases, and the search engine can identify and, optionally, rank the content items based on the search terms or phrases in the query and present the content items to the user (e.g., in order according to the rank).

An initial search by a user may not return results that are of interest to the user. Accordingly, users may add, remove and/or modify search terms in search queries several times until the search engine returns the results that are of interest to the user. One way a user can modify a query to form a new query is to add subsequent terms to a predicate query, e.g., adding the term "forecast" to a previous query of "weather Atlanta" to form the new query "weather Atlanta forecast." However, adding new search terms to the search query may not enhance the user experience if the search engine gives equal or additional weight to the added search term.

SUMMARY

In general, one aspect of the subject matter disclosed in this specification can be embodied in a method for contextual search term evaluation. The method includes receiving a search query during a search session, the search query comprising a plurality of search terms in an ordered sequence; determining if the search query includes a predicate subsequence of search terms in the ordered sequence, the predicate subsequence being a previous search query received during the search session; and in response to determining if the search query includes a predicate subsequence, identifying a subsequent search term in the query, the subsequent search term positioned after the predicate subsequence; and adjusting a search term attribute of the subsequent search term.

In another aspect, another method for contextual search term evaluation includes receiving a first search query during a search session, the first search query comprising one or more first search terms in a first ordered sequence; receiving a second search query during the search session, the second search query comprising two or more second search terms in a second ordered sequence; identifying a predicate search sequence from the second search query, the predicate search sequence being the first ordered sequence from the first search query; identifying subsequent search terms from the second search query, the subsequent search terms including the one or more second search terms of the second search query that are positioned after the predicate search sequence; and for each of the subsequent search terms, adjusting a search term attribute of the subsequent search term.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
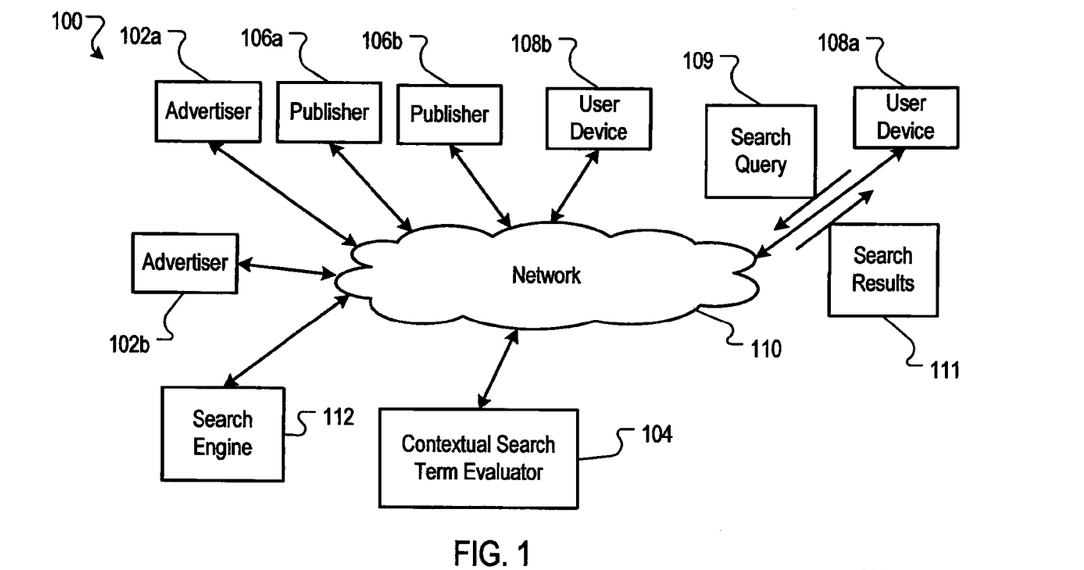
FIG. 1 is a block diagram of an example online environment.

FIG. 1 is a block diagram of an example online environment 100. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102a and 102b, a search engine 112, publishers 106a and 106b, and user devices 108a and 108b. Example user devices 108a and 108b include personal computers, mobile communication devices, television set-top boxes, etc. Although only two advertisers (102a and 102b), two publishers (106a and 106b) and two user devices (108a and 108b) are shown, the online environment 100 may include many thousands of advertisers, publishers and user devices.

§1.0 Content Search Processing

The publishers 106a and 106b can include general content servers that receive requests for content (e.g., web pages or documents related to articles, discussion threads, music, video, graphics, other web page listings, information feeds, product reviews, etc.), and retrieve the requested content in response to the request. For example, content servers related to news content providers, retailers, independent blogs, social network sites, products for sale, or any other entity that provides content over the network 110 can be a publisher.

A user device, such as user device 108a, can submit a search query 109 to the search engine 112, and search results 111 can be provided to the user device 108a in response to the search query 109. The search results 111 can include a link to web pages provided by the publishers 106a and 106b.

In some implementations, the search query 109 can include one or more search terms. A search term can, for example, include a keyword submitted as part of a search query to search engine 112 that is used to retrieve responsive search results. For example, a user can search for historical weather trends in Atlanta. The query submitted can be a search query for "Atlanta weather." The search terms are "Atlanta" and "weather."

To facilitate identification of the search results responsive to queries, the search engine 112 can index the content provided by the publishers 106 (e.g., an index of web pages) for later search and retrieval of search results that are relevant to the queries. An exemplary search engine 112 is described in S. Brin and L. Page, "The Anatomy of a Large-Scale Hypertextual Search Engine," Seventh International World Wide Web Conference, Brisbane, Australia (1998) and in U.S. Pat. No. 6,285,999. Search results can include, for example, lists of web page titles, snippets of text extracted from those web pages, and hypertext links to those web pages, and may be grouped into a predetermined number (e.g., ten) of search results.

The search terms in the query control the search results that are identified by the search engine 112. Although the actual ranking of the search results varies based on the ranking algorithm used by the search engine 112, the search engine 112 can retrieve and rank search results based on the search terms submitted through a search query. For example, a search query for "Atlanta weather" can produce results that are related to the weather in Atlanta, based on the search terms "Atlanta," and "weather."

In some implementations, the search engine 112 utilizes different information from the query and from prospective results to rank the search results. Such information may include, for example, identifiers related to the search results (e.g., document identifiers), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

Usually a user will submit queries during a search session, e.g., a user may be searching for information over a period of time. Multiple search queries can be submitted to the search engine 112 in one search session. In some implementations, a search session can be defined by a period of time between queries. For example, if a particular user device 108a submits a query, a current search session can be initiated. The current search session can be terminated when the search engine 112 has not received further queries from the user for a preset period of time (e.g., 5-10 minutes). In other implementations, the search session can be defined by a user indicating the beginning and end of a search session (e.g., by logging into a search engine interface of the search engine 112 and logging out of a search engine interface). In still further implementations, the search session can be defined by a relationship between a newly received search query and previously received search queries from the same user (e.g. where the previously received search query in a search session is related to digital cameras, if the newly received search query is related to a new topic other than digital cameras, the search session is terminated). Other ways of identifying and tracking a search session can also be used.

Users generally desire that the search queries result in the identification of search results that are most responsive to a user's interest. Often, an initial search query does not produce a search result that satisfies a user's interest, as indicated by the user submitting more queries targeting the same topic or subject. The initial query can be followed by subsequent queries during a search session that include an additional search term to the query, a modified search term in the query, a substituted search term in the query, a removed search term from the query, etc. These modified queries are submitted by the user as the user attempts to find search results that are more relevant to the user's interest.

§2.0 Contextual Search Term Evaluation

A common way a user can modify a query to form a new query is to add subsequent terms to a predicate query, e.g., adding the term "forecast" to a previous query of "weather Atlanta" to form the new query "weather Atlanta forecast." Such an addition of subsequent terms to a predicate query can be interpreted as a signal that the predicate terms resulted in the identification of relevant information.

Once the user finds an ordered sequence of search terms that produces relevant results, the user will tend to reuse this ordered sequence. The ordered sequence that repeats in multiple queries is a predicate subsequence. For example, after the initial query of "weather Atlanta," the ordered sequence "Weather Atlanta" is repeated in a subsequent query "weather Atlanta forecast." Thus, the ordered sequence "weather Atlanta" is a predicate subsequence of the query "weather Atlanta forecast."

The search terms added to the predicate subsequence of the search query are the subsequent search terms of the modified query. A user may not deem the subsequent search terms as significant to the query as the predicate subsequence of terms. For example, if the user follows a query for "weather Atlanta" with "weather Atlanta forecast" and/or "weather Atlanta storm," then the predicate subsequence "weather Atlanta" is followed by the subsequent search terms "forecast" and "storm." The sequence of queries during the search session indicates that the user was attempting to refine the search results produced by the predicate subsequence "weather Atlanta" by appending search terms directed to a search result for historical Atlanta weather data.

In some implementations, the search engine 112 can include a contextual search term evaluator 104 that can make use of such user signals. In one implementation, the contextual search term evaluator can identify a predicate subsequence of search terms in a search query and any subsequent search terms, and then adjust one or more search attributes of the subsequent search terms relative to the predicate subsequence of search terms.

§3.0 Identification of a Predicate Subsequence and Subsequent Search Term

Figure 2:
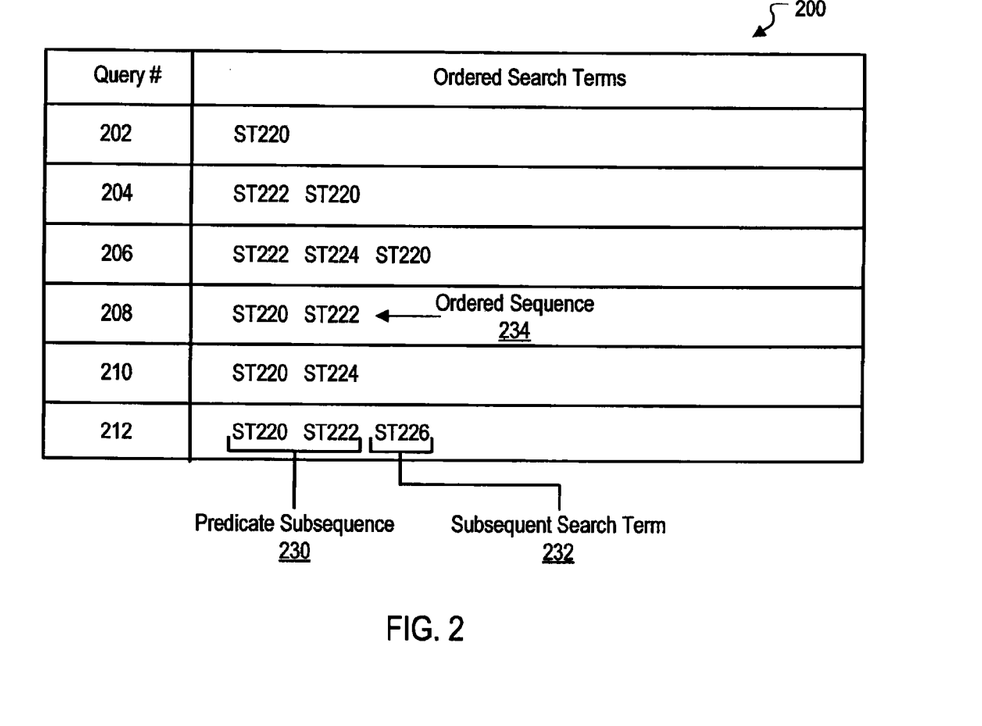
FIG. 2 is a diagram illustrating a predicate subsequence and a subsequent search term in a search query received during a search session.

FIG. 2 is a diagram 200 illustrating a predicate subsequence and a subsequent search term in a search query received during a search session. In the diagram 200, the predicate subsequence of a query, e.g., query 212, is identified when an ordered sequence from a previous query repeats in the search query. The remaining search terms in the current search query that are not included in the ordered sequence are the subsequent search terms.

An ordered sequence is a sequence of search terms in a specified order. Although the previous example describes a predicate subsequence being identified in the context of a first query that is immediately followed by a second query, the second query does not need to be submitted immediately after the first query. All queries belonging to a search session can be identified, and any query that was submitted previously in the search session can be used to identify a predicate subsequence in a new query belonging to the search session.

A predicate subsequence is present in a current search query when an ordered sequence from a previous search query is present in the current search query in the same ordinal position. For example, the queries 204, 206, 208, 210 and 212 all have ordered sequences of search terms (ST). The query 212, comprising search terms ST220, ST222 and ST226 is the current query input by a user during a search session. The only predicate subsequence identified in the diagram 200 is the ordered sequence 234, as the ordered sequence 234 is included in the current search query 212 and was previously submitted as a search query during the search session, i.e., query 208 that precedes an intermediate query 210.

If the search query contains a predicate subsequence, the subsequent search terms in the query can also be identified. For example, in a query with a predicate subsequence, the subsequent search terms are the search terms that follow immediately after the predicate subsequence. Thus, the subsequent search term 232 of the query 212 is comprised of the search term ST226 because the search term ST226 follows after the predicate subsequence 230.

§4.0 Adjustment of Subsequent Search Term Attributes

If a predicate subsequence of search terms and a subsequent search term are identified in a current query, the search term attributes of the predicate subsequence and the subsequent search term are adjusted such that the predicate subsequence is emphasized over the subsequent search term. An adjustment of the search attributes associated with the subsequent search term can include modifying the weight assigned to subsequent search terms in the query. Another adjustment of the search attributes associated with the subsequent search term can include optionalizing the subsequent search terms. Yet another adjustment of the search attribute associated with the subsequent search term can include identifying variants for the subsequent search term. Other methods of adjusting the importance of the subsequent search term can also be used.

§4.1 Weight Adjustment

In some implementations, the weight of the subsequent search term can be modified to deemphasize the subsequent search term given the context of the search session. Search terms that are more important can be emphasized by being assigned a higher weight, while search terms that are less important can be minimized by being assigned a lower weight.

In some implementations, the search engine 112 can assign a lower weight to the subsequent search term to deemphasize the subsequent search terms relative to the predicate subsequence. The search results produced will be more closely related to the predicate subsequence than the subsequent search result.

For example, a series of search queries during a search session may produce a search query for "Atlanta weather" followed by the search query for "Atlanta weather storm." In the query for "Atlanta weather storm," the terms of the predicate subsequence "Atlanta weather" can be weighted more heavily than the subsequent term "storm." As a result, the search results produced in response to the search query will likely be closely related to the predicate subsequence "Atlanta weather," and the relevance of the search results to the subsequent search term "storm" will be dependent upon the weight assigned to the subsequent search term. For example, if the search term weights are normalized, the terms "Atlanta" and "weather" may have weights of 1.0, and the term "storm" may have a reduced weight of 0.5. These weights can be used to scale the dot products of feature vectors corresponding to the query and the documents. The assigning of a low weight to the subsequent search term effectively results in the search engine 112 identifying results responsive to the predicate subsequence of "Atlanta weather" and searching that set of search results for results responsive to "storm."

While an example weight adjustment scheme has been described above, other query weight adjustment schemes can also be used. For example, term frequency-inverse document frequency weights can be scaled; query weights for subsequent query terms can be limited to a fraction of a query weight of any term in a predicate subsequence; etc.

§4.2 Optionalization Adjustment

In some implementations, the subsequent search terms can be optionalized. For example, the weight of a subsequent search term can be reduced to render the subsequent search term optional to the search query. Accordingly, the search results produced in response to the search query will not be required to include the optional subsequent search term. However, the search engine 112 can use the subsequent search term to determine the ranking of the search results. For example, where the query is for "Atlanta weather storm," the search terms from the predicate subsequence, "Atlanta weather," would be used to produce responsive search results. The search term from the subsequent search term, "storm," would be used to adjust the rankings of the search results produced by the predicate subsequence. Other methods of making a search term optional can also be used, e.g., by adjusting a default Boolean function associated with the subsequent search terms.

§4.3 Variant Adjustment

Substituting the subsequent search term with a variant of the subsequent search term is another method of placing a higher level of importance on the predicate subsequence than on the subsequent search term. The search results that are identified in response to the search query will contain results that are responsive to the predicate subsequence and the subsequent search term or variants of the subsequent search term. Thus, the predicate subsequence is emphasized as integral to the search query, and the search results are not limited to results responsive only to the subsequent search term.

In some implementations, the variant can be a term that is statistically confused with the subsequent search term, or search terms that are in a term cluster with the subsequent search term. A term cluster can be a group of related tokens that are associated with each other. The search terms included in a term cluster are identified from query logs as terms that share a common trait—e.g., are statistically related to each other, such as the term "storm" often being found with the term "weather" or "thunder" in queries; etc. Such clusters can be identified by, for example, k-means clustering techniques, c-means clustering, quality threshold clustering, etc. Although example clusters of only two terms have been described, the term clusters can include many more search terms than just two terms. Other term clustering or grouping processes can also be used to identify related search term.

The variants of the subsequent search term can be used to supplement the search query although emphasis remains on the predicate subsequence of the search query. The search query can produce results that are responsive to the predicate subsequence, and either the subsequent search term or variants of the subsequent search term. Thus the predicate subsequence is associated with every search result identified, while the subsequent search term need not be so associated. Accordingly, the emphasis remains on producing search results responsive to the predicate subsequence.

§4.4 Example Implementation

Figure 3:
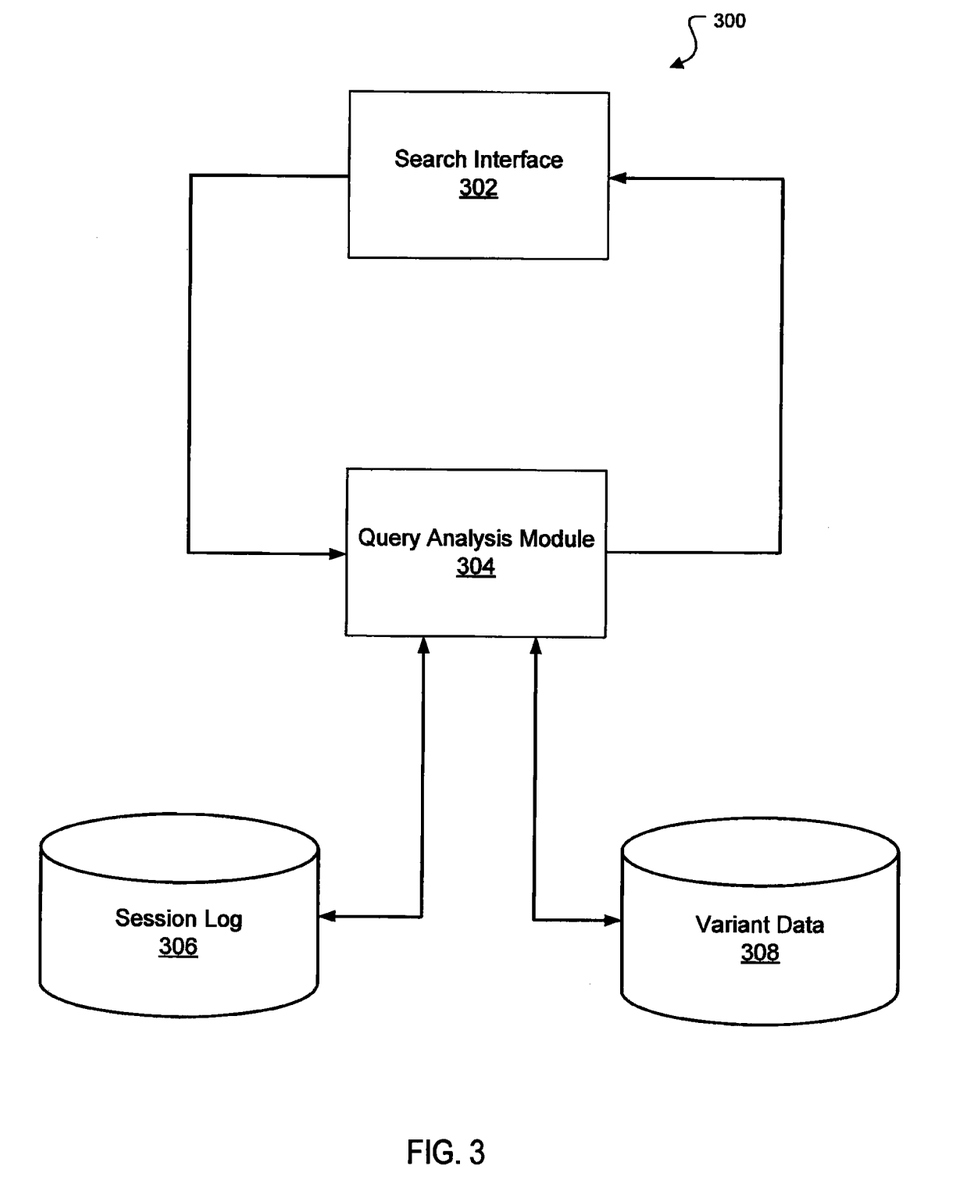
FIG. 3 is a block diagram of an example contextual search term evaluator.

FIG. 3 is a block diagram of an example contextual search term evaluator system 300. The system 300 can, for example, be used to implement the contextual search term evaluator 104 of FIG. 1 in a data processing apparatus.

The system 300 can identify a predicate subsequence of search terms in a query based on the context of the search session. The system 300 can then identify a subsequent search term in the query and adjust a search term attribute of the subsequent search term. For example, the system 300 can assign the subsequent search term a lower weight than it assigns the predicate subsequence; can modify the subsequent search term to include variants of the subsequent search term; or can optionalized the subsequent search term.

In some implementations, the contextual query processing system 300 can include a search interface 302 and a query analysis module 304. The system 300 may be implemented as part of a search engine, or as a separate component of the search engine, or as a system that communicates with a search engine.

The search interface 302 can receive a current search query during a search session. For example, a user searching for weather patterns in Atlanta can submit a search query for "Atlanta weather trends," that is received by the search interface 302.

The query analysis module 304 can identify a predicate subsequence in the search query. The predicate subsequence is an ordered sequence of search terms that is identified by the query analysis module 304 as being present in at least one other query during the search session. The query analysis module 304 can identify a predicate subsequence in the search query by analyzing the current search query and previous search queries submitted during the session, stored in the session log 306. For example, if the query for "Atlanta weather trends" is followed by a query for "Atlanta weather forecast," the search terms "Atlanta" and "weather" are in an ordered sequence that was submitted as part of a search query in at least one previous search query during the search session, i.e., the query for "Atlanta weather trends."

If the search query contains a predicate subsequence, the query analysis module 304 can identify a subsequent search term in the search query. The subsequent search term is the one or more search terms that follow after the predicate subsequence in the search query. For example, where the predicate subsequence is "Atlanta weather" in a search query for "Atlanta weather forecast," the subsequent search term is "forecast."

The query analysis module 304 can adjust the search attributes associated with the search terms such that the predicate subsequence is emphasized over the subsequent search terms, as described in sections 4.1-4.3 above. For example, the query analysis module 304 can assign the predicate subsequence more importance than the subsequent search terms by giving the predicate subsequence a higher weight; or can optionalize the subsequent search term; or can substitute variants for the subsequent search term.

5.0 Example Contextual Revision Processes

Figure 4:
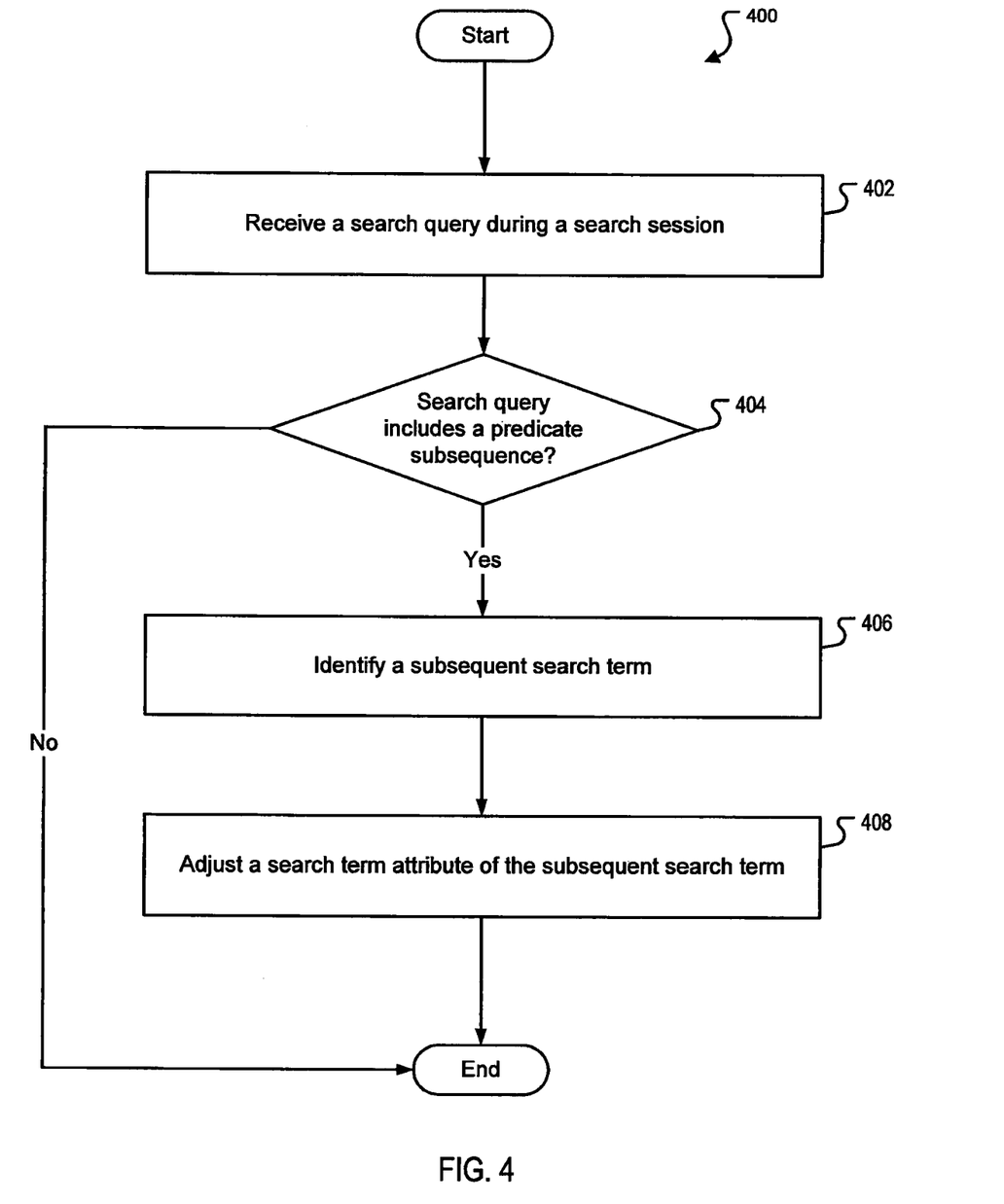
FIG. 4 is a flow diagram of a contextual search term evaluation process.

FIG. 4 is a flow diagram of a contextual search term evaluation process 400. The process 400 can, for example, be implemented by the system 300 of FIG. 3.

Stage 402 receives a search query during a search session. For example, the search interface 302 may receive a search query for "Atlanta weather forecast."

Stage 404 determines whether the search query includes a predicate subsequence. For example, the query analysis module 304 determines whether a previous query was submitted for "Atlanta weather" during a search session. Because the ordered sequence "Atlanta weather" was included in a previous query during the search session, the query analysis module 304 determines that the search query "Atlanta weather forecast" includes the predicate subsequence "Atlanta weather."

If stage 404 determines that the search query includes a predicate subsequence, stage 406 identifies a subsequent search term. For example, where stage 404 determines that the search query contains a predicate subsequence, the query analysis module 304 can identify any search terms after the predicate subsequence as subsequent search terms. Thus, the search term "forecast" that is ordered after "Atlanta weather" is the subsequent search term.

Further, if stage 404 determines that the search query includes a predicate subsequence, stage 408 adjusts a search term attribute of the subsequent search term. For example, where stage 404 determines that the search query "Atlanta weather forecast" includes the predicate subsequence "Atlanta weather," the query analysis module 304 can adjust the weight associated with the subsequent search term "forecast."

Figure 5:
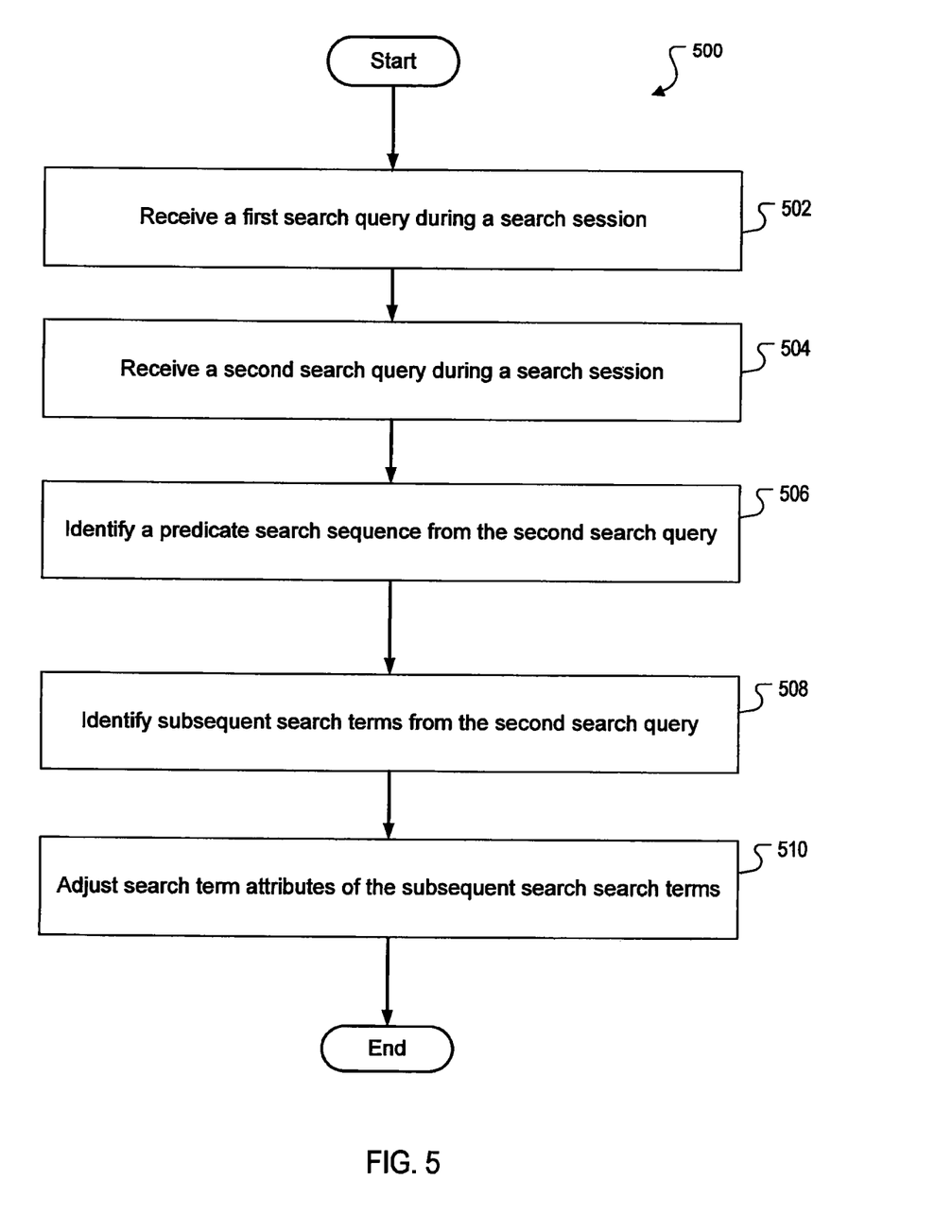
FIG. 5 is flow diagram of another contextual search term evaluation process.

FIG. 5 is flow diagram of another contextual search term evaluation process 500. The process 500 can, for example, be implemented by the system 300 of FIG. 3.

Stage 502 receives a first search query during a search session. For example, the search interface 302 may receive a search query for "used hybrid sedan."

Stage 504 receives a second query during a search session. For example, the search interface 302 may receive a second query for "used hybrid automobile."

Stage 506 identifies a predicate search sequence from the second search query. For example, the query analysis module 304 can identify that the both the first query and second query included the ordered sequence "used hybrid." Accordingly, the query analysis module 304 determines that the search query includes the predicate subsequence "used hybrid."

Stage 508 identifies subsequent search terms from the second search query. For example, the query analysis module 304 can identify any search terms after the predicate subsequence of "used hybrid" as subsequent search terms. The search term "automobile" is identified as a subsequent search term.

Stage 510 adjusts search term attributes of the subsequent search terms. For example, the query analysis module 304 can substitute the variant "car" or "auto" for the subsequent search term "automobile;" or can adjust the weight associated with the term "automobile;" or can optionalize the term "automobile."

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for contextual query processing, comprising:
   receiving a first search query from a user device, the search query being received during a search session occurring at the user device, wherein the search query comprises a plurality of first search terms in an ordered sequence;
   receiving a second search query from the user device after receiving the first search query, the second search query being received during the search session occurring at the user device, wherein the search query comprises a plurality of second search terms in an ordered sequence;
   comparing the second search query to the first search query and based on the comparison determining that the second search query includes, in the ordered sequence, a predicate subsequence of search terms that is the first search query received from the user device during the search session and wherein a search term in the plurality of second search terms is positioned after the predicate subsequence in the ordered sequence;
   in response to the determination that the second search query includes the predicate subsequence:
      determining that the search term positioned after the predicate subsequence in the ordered sequence is a subsequent search term; and adjusting a search term attribute to modify a relative importance of the predicate subsequence relative to the subsequent search term, wherein the adjustment comprises reducing a weight associated with the subsequent search term relative to a weight associated with the predicate subsequence, and wherein the adjustment causes the adjusted search term attribute to be different from the search term attribute for the second query when the second query is determined to not include the predicate subsequence.

2. The method of claim 1, wherein adjusting a search term attribute to modify a relative importance of the predicate subsequence relative to the subsequent search term comprises optionalizing the subsequent search term as a search term that is optional to the search results produced in response to the search query.

3. The method of claim 1, wherein each of the plurality of search terms in the ordered sequence of the search query has a corresponding weight that measures the importance of the search term relative to other search terms in the ordered sequence, and adjusting a search term attribute to modify a relative importance of the predicate subsequence relative to the subsequent search term comprises reducing the weight associated with the subsequent search term.

4. The method of claim 1, wherein adjusting a search term attribute to modify a relative importance of the predicate subsequence relative to the subsequent search term comprises:
identifying a variation of the subsequent search term; and
modifying the subsequent search term in the search query to include the variation of the subsequent search term.

5. The method of claim 4, wherein the variation of the subsequent search term is a synonym of the subsequent search term.

6. The method of claim 1, wherein the search query is a query that is received immediately after the previous query.

7. The method of claim 1, wherein the search query is a query that is received after one or more intermediate search queries, the intermediate search queries received after the previous query during the search session.

8. A computer implemented method for contextual query processing, comprising:
receiving a first search query from a user device during a search session occurring at the user device, the first search query comprising one or more first search terms in a first ordered sequence;
receiving a second search query from the user device and during the search session, the second search query comprising two or more second search terms in a second ordered sequence;
comparing the second search query to the first search query and based on the comparison identifying a predicate search sequence from the second search query, the predicate search sequence being the first ordered sequence from the first search query;
responsive to the identification of the predicate search sequence:
identifying subsequent search terms from the second search query, the subsequent search terms including the one or more second search terms of the second search query that are positioned after the predicate search sequence in the second ordered sequence; and
for each of the subsequent search terms, adjusting a search term attribute to modify a relative importance of the predicate subsequence relative to the subsequent search term, wherein the adjustment comprises reducing a weight associated with the subsequent search term relative to a weight associated with the predicate subsequence, and wherein the adjustment causes the adjusted search term attribute to be different from the search term attribute for the second query when the second query is determined to not include the predicate subsequence.

9. The method of claim 8, wherein adjusting a search term attribute to modify a relative importance of the predicate subsequence relative to the subsequent search term comprises optionalizing the subsequent search term as a search term that is optional to the search results produced in response to the search query.

10. The method of claim 8, wherein adjusting a search term attribute to modify a relative importance of the predicate subsequence relative to the subsequent search term comprises reducing the weight associated with the subsequent search term, each of the plurality of search terms in the second ordered sequence of the second search query having a weight that measures the importance of the search term relative to other search terms in the second ordered sequence.

11. The method of claim 8, wherein adjusting a search term attribute to modify a relative importance of the predicate subsequence relative to the subsequent search term comprises:
identifying a variation of the subsequent search term; and
replacing the subsequent search term in the search query with the variation of the subsequent search term.

12. The method of claim 11, wherein the variation of the subsequent search term is a synonym of the subsequent search term.

13. The method of claim 8, wherein the first search query was received immediately before the second search query.

14. The method of claim 8, wherein the first search query was received before one or more intermediate search queries, the intermediate search queries received before the second search query.

15. A non-transitory computer readable medium storing software comprising instructions executable by a data processing apparatus, and upon such execution causes the data processing apparatus to perform operations comprising:
receiving a first search query from a user device, the search query being received during a search session occurring at the user device, wherein the search query comprises a plurality of first search terms in an ordered sequence;
receiving a second search query from the user device after receiving the first search query, the second search query being received during the search session occurring at the user device, wherein the search query comprises a plurality of second search terms in an ordered sequence;
comparing the second search query to the first search query and based on the comparison determining that the second search query includes, in the ordered sequence, a predicate subsequence of search terms that is the first search query received from the user device during the search session and wherein a search term in the plurality of search terms is positioned after the predicate subsequence in the ordered sequence;
in response to the determination that the second search query includes the predicate subsequence:
determining that the search term positioned after the predicate subsequence is a subsequent search term; and
adjusting a search term attribute of the subsequent search term to modify a relative importance of the predicate subsequence relative to the subsequent search term, wherein the adjustment comprises reducing a weight associated with the subsequent search term relative to a weight associated with the predicate subsequence, and wherein the adjustment causes the adjusted search term attribute to be different from the search term attribute for the second query when the second query is determined to not include the predicate subsequence.

16. A system, comprising:

at least one data processing apparatus;

instructions stored on a machine readable storage device for execution by the at least one data processing apparatus, the instructions comprising instructions to provide:

a search interface configured to receive a first search query from a user device and during a search session occurring at the user device, the search query comprising a plurality of search terms in an ordered sequence and to receive a second search query from the user device after receiving the first search query, the second search query being received during the search session occurring at the user device, wherein the search query comprises a plurality of second search terms in an ordered sequence; and a query analysis module configured to:

compare the second search query to the first search query and based on the comparison determine that the second search query includes, in the ordered sequence, a predicate subsequence of search terms that is the first search query received from the user device during the search session and wherein a search term in the plurality of search terms is positioned after the predicate subsequence in the ordered sequence;

in response to the determination that the second search query includes the predicate subsequence:

determining that the search term positioned after the predicate subsequence in the ordered sequence is a subsequent search term; and adjust a search term attribute of the subsequent search term to modify a relative importance of the predicate subsequence relative to the subsequent search term, wherein the adjustment comprises reducing a weight associated with the subsequent search term relative to a weight associated with the predicate subsequence, and wherein the adjustment causes the adjusted search term attribute to be different from the search term attribute for the second query when the second query is determined to not include the predicate subsequence.

17. The system of claim 16, wherein the query analysis module is further configured to modify the weight of the subsequent search term, wherein the weight of a search term specifies the importance of the search term relative to other search terms within the search query.

18. The system of claim 16, wherein the query analysis module is further configured to identify a variation of the subsequent search term and replace the subsequent search term with the variation of the subsequent search term.

* * * * *